Figure 1:
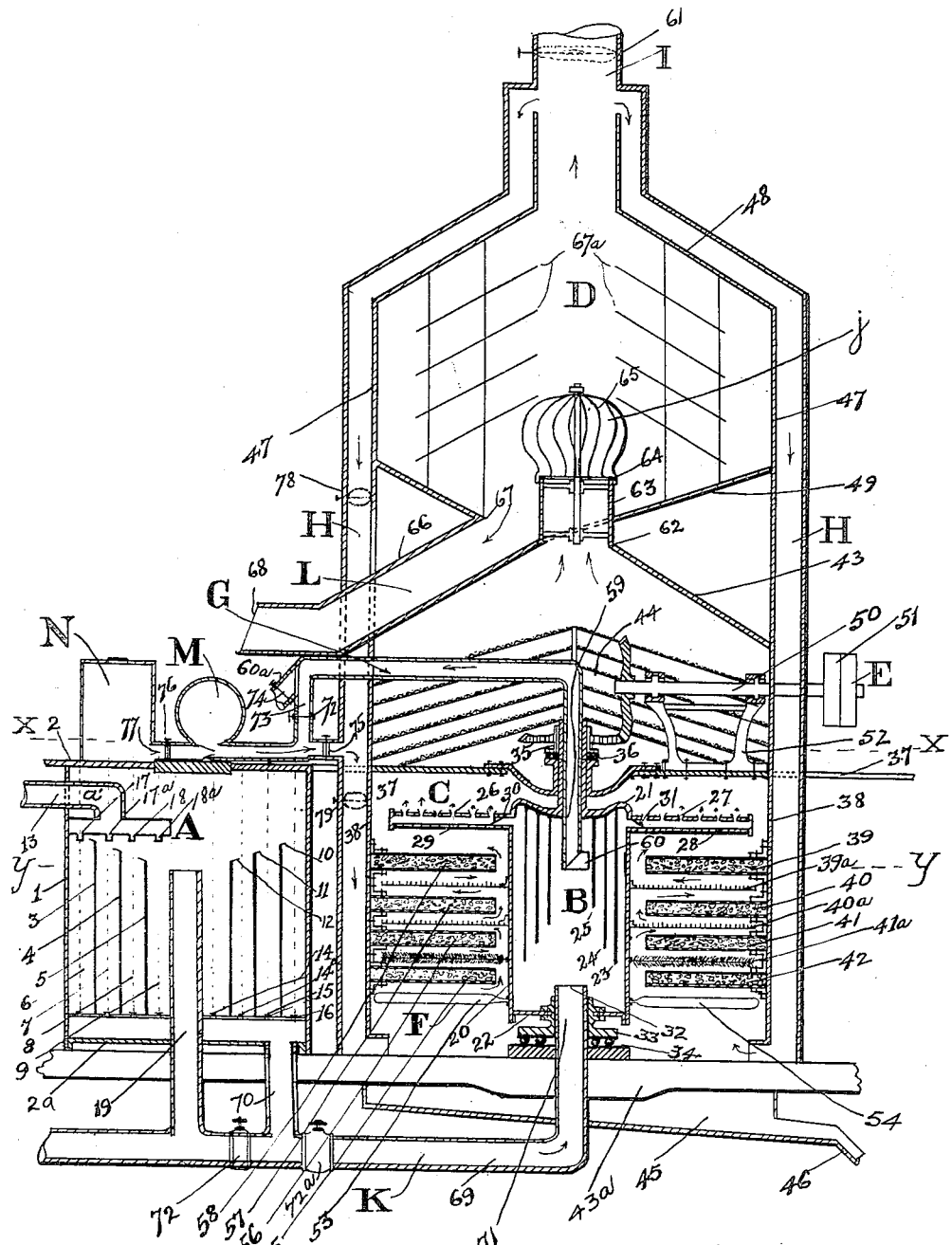

J. P. BALL.
SEWAGE PURIFIER.
APPLICATION FILED JUNE 23, 1921.

1,421,891.

Patented July 4, 1922.
2 SHEETS—SHEET 2.

Inventor,
John P. Ball,

UNITED STATES PATENT OFFICE.

JOHN P. BALL, OF CHICAGO, ILLINOIS.

SEWAGE PURIFIER.

1,421,891.  Specification of Letters Patent.  Patented July 4, 1922.

Application filed June 23, 1921. Serial No. 479,741.

*To all whom it may concern:*

Be it known that I, JOHN P. BALL, a citizen of the United States, residing in Chicago, in the county of Cook, in the State of Illinois, United States of America, have invented certain new and useful Improvements in Sewage Purifiers, of which the following is a specification.

An analysis of the present methods employed for treating sewage show that a purified effluent is obtained, but during the process of purification, a residue is precipitated which is called sludge. Up to the present time there is no satisfactory disposition for this residue. Crude sludge presses have been used but the operation is difficult, costly and almost impossible. It is therefore the object of this invention to perfect an apparatus, which by the application of excess amount of air throughout a series of filters, whereby the solid matter may be separated from the liquids, contained in the sludge.

This invention relates to devices for treating, separating, atomizing, filtering, aerating, drying and collecting sewage sludge, and aims to provide certain improvements therein.

In most sewage treating plants, whether they are grit chambers, bar screens or mesh screens, tank wells and towers, sedimentation chambers, septic tanks, contact beds, or irrigation fields, there remains a residue which is called sludge. The amount of dried sludge in sewage is estimated at 2.1 ounces per capita per day. It is also estimated that from 80 to 90 per cent of sludge consists of water; from 10 to 20 per cent of organic and inorganic matter with a small percentage of nitrogen, phosphoric acid, and potassium carbonate. Although much scientific advancement has been made in the purification of sewage effluent, very little practical application of the separation of solids in sludge has been undertaken.

It is an object of my invention, therefore, to provide means for removing the solid matter from the sludge, so that the effluent therefrom may be nearly the constituency of water. Preferably, I employ for this purpose a series of concentric sedimentation chambers having overflow weirs, each of which are at a lower elevation, a revoluble mounted reduction chamber provided with a plurality of sludge sprinklers and an air intake fan revolving with said reduction chamber, a filter and desiccating basin having a series of filter trays surrounding said reduction chamber, a plurality of air passages communicating with said filter trays, a superposed dust collecting drum, reverse and return air passages, means for separately withdrawing the different products, means for rotating the currents in the dust drum and means for controlling the main current.

My invention also includes means for differentially driving the reduction chamber, means for adjusting the flow from the sludge sprinklers, improved bearings and bearing disposition, improved damper arrangement, and various features of improvement construction, arrangement and details, all of which will be hereinafter more fully set forth.

Figure 3:
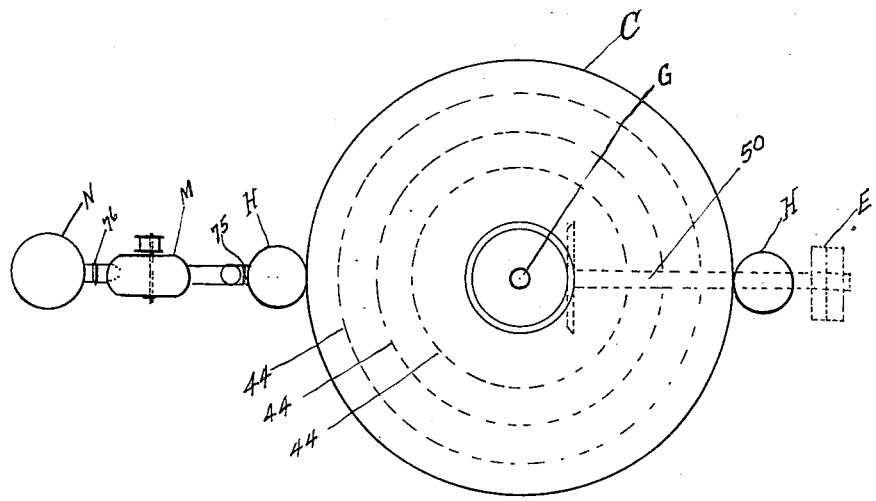
Figure 2:
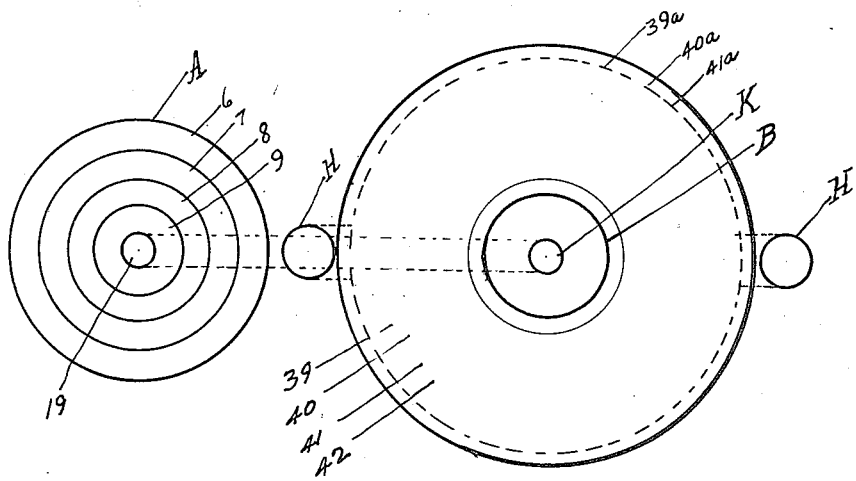

In the accompanying drawing which shows a certain adaptation of my invention Figure 1 is a vertical axial section, Fig. 2 a horizontal plane section through $y\ y$ and Fig. 3 a horizontal section through $x\ x$.

Referring to the drawing $a'$ represents a main sewer. A represents the sedimentation chamber, B the dewatering chamber, C the filter and desiccating chamber, and D the dust collecting chamber, E the driving mechanism, F a blower, G the overflow tube, H the reverse and return passage, I the final exhaust passage, J the dust ejector, K a conduit, L a dried sludge outlet, and M an outside blower.

These may be of any usual or suitable construction and arrangement capable of collecting the sludge, creating the necessary current and discharging the products.

Referring to Fig. 1, I will now describe in detail the preferred form of my invention in the adaptation therein illustrated. The sedimentation chamber A has a cylindrical body (1) with flat top 2 and bottom $2^a$, and is provided with a series of concentric cylindrical partitions 3, 4 and 5 shown of different heights, so that the chamber interior will be divided into concentrically arranged compartments 6, 7, 8 and 9, having communcation with each other by means of overflow weirs 10, 11 and 12. These overflow weirs are a special feature of my invention and will be described more fully below. The walls and bottom of the chamber A as well as the concentric partition 3, 4 and 5, may be composed of any suitable material such as iron, brick, concrete or the like, while the top 2 of the chamber A may be provided with a removable cover so that access to the respective compartments may be had. The drawing shows but one sedimentation chamber A, but in practice as many of these may be constructed as necessary to take care of the sewage flow. The purpose of the sedimentation chambers is to collect the raw sludge that may be delivered direct from sewage treatment plants or they may be located in the flow of sewage effluent and along the line of the main sewer. Each annular edge of the overflow weirs 10, 11 and 12 are designed to be perfectly level and each on a different horizontal plane, each weir may be constructed of special material so that a somewhat classification of the solids suspended in the sludge may be obtained in the different compartments of the chamber, i. e., overflow weir 10 may be constructed of a fine steel bar or mesh screens extending around the partition, while overflow weir 11 may be of fibre fabric mesh; and overflow weir 12 may be constructed of charcoal or porous composition extended in like manner around the partition. The sewage which entered the outer compartment by means of the sewer pipe 13, flows over the separate weirs to the other compartments depositing sludge in each compartment of the chamber. At the bottom of each compartment a valve outlet 14, 14ª, 15 and 16 is provided so as to allow the collected sludge to enter the conduit K, which conduit communicates with the bottom of the reduction chamber B. The sewer pipe inlet 13 is also provided with valves and openings 17, 17ª, 18 and 18ª so as to supply the separate compartments with sewage as desired, the process of emptying a compartment may be effected without any inflow of sewage to that compartment. An overflow pipe as at 19 is provided in the center of compartment 9 so as to carry off the effluent and emptying into other basins or back again into the sewer at a lower level.

The dewatering chamber B so called because it reduces the sludge to a coagulated consistency, is preferably a revoluble chamber. It has a cylindrical body 20, a curved top 21 and a flat bottom 22; the internal part of the body is divided into as many partitions as to give the necessary compartments for the separation of the solid matter contained in the sludge, three partitions 23, 24 and 25 being shown which are suspended from the top of the chamber and extend downward to different lengths; in operation these compartments assist in the separation of the sludge, so that the heavier material may be driven to the outermost compartment and eventually to the sprinklers 26 and 27 through the conduit pipes 28 and 29 which communicate with the outer compartment of the chamber. The conduit pipes are provided with a set of spring balance valves 30 and 31; these spring valves operate with the speed of the mechanism, a sufficient number of revolutions per minute being necessary to open the valve, so that the chamber may be revolving a sufficient length of time so as to allow the sludge to separate before the sprinklers begin to operate. The sprinklers are preferably nozular openings so as to allow the sludge to be distributed over the filter beds or trays in a finely divided state as described later. The sludge enters the dewatering chamber B through the opening 32 in the conduit K, the sludge will then raise by gravity to the level of the liquid in the sedimentation chamber A. The reduction chamber B is revolubly mounted on a frame 33 resting on suitable bearings 34. The upper verticle axis of the machine 35 is also provided with bearings 36 and supported to the frame 37 which is shown as crossing the chamber and anchored in concrete supports independent of the chambers C and H.

The filter and desiccating chamber C is preferably a stationary chamber, it has a cylindrical body 38 which surrounds the dewatering chamber and of sufficient diameter dimensions to allow room for filter trays 39, 40, 41 and 42; it has a conical shaped top 43 and an open bottom, and the entire chamber and filter trays are supported on an I beam construction 43ª which extends across the machine and also supports the chamber B together with its bearings. The filter trays 39, 40, 41, and 42 are preferably annular in form and in laminated horizontal layers, or they may be slightly inclined so as to drain the material from the upper tray to the one below. They are supported by the body of the chamber C at the outer edge and braced and bolted as to the cylinder 38. Between each filter tray and bolted to the chamber B is provided an intermediate brush or cleaner 39ª, 40ª and 41ª each revolving with the dewatering chamber B so as to clean by friction the annular opening between said filter trays and to precipitate the coagulated sludge. The filter trays are filled with a suitable material used for a quick filter such as sand, gravel, charcoal, iron ore, slag or the like. Superposed above the filter trays and pending from the top 43 a series of filter screens 44 are placed in conical form and with suitable openings between each screen to allow the precipitated sludge to distribute throughout the mesh of the screens.

Below the filter screens and below the filter trays an underdrain 45 is provided, which is a feature of my invention, and consists of an annular pan extending to the outer periphery of the filter chamber to catch the drippings that may fall from the filter trays;

this receiving pan is drained by a tube 46, which may lead back to a sewer at a lower elevation.

The dust chamber D has a cylindrical body 47, a conical top 48 and bottom 49; it is preferably placed above the chamber C and is supported thereby; it is provided with openings in the top and bottom to receive and discharge the dust as will be described later.

The driving mechanism E shown consists of a driving shaft 50 and carrying fast and loose pulleys 51 and geared to the driven parts by bevel gears. This shaft is mounted in the bearing frames 52 which frames are bolted to the main frame 37.

The fan F is preferably a circular horizontal air fan with inturned blades as shown 53 and 54, so that in operation an intake forced current of air of cyclonic action is received into the filter chamber C. The fan is supported at the base of chamber B and revolves therewith. In operation the fan forces an intake current of air which is distributed over the filter surfaces as shown at 55, 56, 57 and 58 as annularly surrounding the dewatering chamber so as to have as great a possible surface of filter exposed to the aerating process produced by the fan F.

At the opening 59 in the top of the chamber B, a stationary overflow tube G is provided, which has a bevel shaped intake 60 with an inturned screw construction. In operation is is evident that the chamber C revolving about the stationary tube 59 creates a momentum to the liquid contained in said chamber, in other words this revoluble momentum is transmitted to the liquid contained therein, and a portion of the liquid will rise in the overflow tube G and will flow outwardly at the orifice 60$^a$ where it may be drained back of the sewer.

The return passage H constitutes a sinuous conduit between the final exhaust passage I and the fan or blower F, causing a continuous air current to flow, first through the chamber C and then into the chamber D. This air current may be regulated by means of the damper 61 in the final exhaust stack. Any desired number of these return passages may be interposed between the exhaust stack I and the section fan F, two being shown in the drawing.

With an airtight joint at an opening 62 in the top of the chamber C a cylindrical conduit 63 is provided to effect communication from the chamber C to the chamber D. The air current flowing through the filter chamber C swings into and through the filter trays 39, 40, 41 and 42 and is further distributed over the filter surface by wire brushes 39$^a$, 40$^a$ and 41$^a$, and thence through the filter screens and through the passage 63 to the dust chamber D, from whence it may continue to the exhaust stack I, or may be drawn through the suction passages H by the blower fan F. In passing through the filter beds, which already being charged with sludge, the air current becomes charged with dried sludge in the form of dust. In passing from the filter chamber C to the dust chamber D, the dust laden current encounters the dust ejector J, which consists of a series of fan shaped winnowing blades 65, nested in hood form and revolubly mounted as shown at 64 on the cylindrical conduit 63; in the revolving with the forced air current these blades throw towards the outer edges of the dust drum D the heavier particles of dried sludge which settle in the lower portion of the dust drum; the lighter fluid current will pass upward through the discharge stack I or into the reverse and return passages H. The object of the dust ejecting hood is to form a surface of discontinuity in the fluid current so that the dust may be separated from the air at this point, and eventually settles to the final dust outlet L. This final dust outlet consists of a sinuous conduit 66 which communicates at the upper end with the lower part of the dust drum at 67 and is also provided with a hinged door 68 at the lower end. The dust drum D is also provided with a series of baffle blades 67$^a$, annular in form and placed in superposed position so as to catch the dust particles in the flowing current.

The conduit K consists of a sinuous pipe 69 communicating with the lower part of the sedimentation chamber A at 70 and also at the lower part of the dewatering chamber B at 71 forming a free passage for the sludge from the sedimentation chamber to the dewatering chamber. Gate valves 72, 72$^a$ are interposed at a point between the openings so as to control the flow of the liquid sludge.

In operation this process of purification is a natural one because it employs the natural sedimentation of sludge which for a time is sprayed over a series of filter beds composed of sand and gravel or the like; the sludge so treated is then subjected to an aerating process creating the presence of oxygen and living micro-organisms which produce an oxidizing effect on the solids contained in the sludge. This oxidization being accomplished the particles so treated are subjected to a current of forced air through the mass which dries and carries them in the air current to a dust collecting chamber.

The arranging together of the compartments in the sedimentation chamber and nesting them together attains great compactness which facilitates the uniformity of flow over the weirs. This uniformity of the effective parts is a feature of my invention which is accomplished by lowering each cylindrical weir below the succedding cylindrical weir of the adjacent partition.

As means for supplying an additional compressed air current to clean the filter trays and screen, a supplemental blower M is provided, which in operation forces air into the reduction chamber through the conduits 73 and 59. The valves 74 and 72 being closed and the valve 75 being opened, and the blower M in operation, then air will be forced into the dewatering chamber B and will escape through the nozzles 26 and 27. This additional air pressure will clear the nozzles and clean the dewatering chamber. It will also clean the filter material and the filter screens which will afford a quick filter for the sludge.

In order to provide an additional filter and drier for the sludge to be treated in the filter chamber, a sand box N is placed in direct communication with the blower M so as to inject a current of fine dry sand into the return passage H and eventually into the lower part of the filter chamber where it will mingle with the flowing current so as to act more quickly in filtering and drying the sludge laden current in said filter chamber. The supply of blow sand is controlled by a gate valve 76 located on the line of conduit 77 between the sand box N and the blower M. Supplemental dampers 78 and 79 are disposed in the reverse and return passage I so as to control the air currents therein.

The filter chamber surrounding the dewatering chamber and the superposed dust chamber accomplishes a convenient construction of the separate elements that combine to make up the machine. These elements together with spacing and concentrically nesting of the filter trays within the chamber, and the blower combined with the revoluble reduction chamber are all features of my invention. Many of the features are subject matter of claims in my application of sewage purifiers, Serial Numbers 329,559, Oct. 9, 1919; 394,693, July 8, 1920; 420,438, Oct. 29, 1920; 445,038, Feb. 14, 1921.

What I claim is:—

1. A system for purifying sewage comprising in combination, a sedimentation chamber containing a plurality of concentric compartments, an annular overflow weir communicating between each compartment at successive lower planes, a revoluble mounted dewatering chamber, a cylindrical filter chamber, surrounding said dewatering chamber, and a dust collecting drum superimposed upon said filter chamber, means for supplying sludge to the sedimentation chamber, communicating means for supplying sludge from the sedimentation chamber to the dewatering chamber, discharge means from said dewatering chamber into said filter chamber, aerating means through said filter chamber, and means for causing an upward current of air to flow through said filter, a sinuous current passage for extracting the particles carried in said filter current, discharge means for collecting said particles into said dust drum, and means affording an outlet passage for material collected in such drum.

2. A system of sewage purifiers comprising in combination, a sedimentation chamber, means for causing sludge to descend therein, concentric means for causing sediment to be retained therein, a revoluble mounted dewatering chamber, adjoined to said sedimentation chamber, means affording a communicating passage between said sedimentation chamber and said dewatering chamber, means for supplying sludge to said dewatering chamber, means for employing centrifugal force to dewater said sludge, means for forcing the so treated sludge into a filter chamber adjoined to and surrounding said dewatering chamber, means for causing a fluid current to flow through said filter chamber, a dust chamber adjoined to and receiving current from said filter chamber, and means affording a passage for returning such current above said dust chamber to below said filter chamber.

3. A system of separating sewage comprising in combination, a sedimentation chamber and a dewatering chamber, communicating with each other and on horizontal planes of approximately equal elevation, means for supplying sewage to the sedimentation chamber, means for discharging sludge from the dewatering chamber, in combination with a chamber surrounding said dewatering chamber and containing a plurality of superposed annular filters composed of granular material other than the materials undergoing separation, means for causing a fluid current to flow through said filters, a dust chamber adjoined to and receiving particles carried in said current from said filters, and means for collecting said particles inwardly of said dust chamber.

4. A system for separating sewage comprising in combination, a sedimentation chamber and a dewatering chamber communicating with each other and located on horizontal planes of approximately equal elevation, means for supplying sewage to the sedimentation chamber, means for discharging sludge from the dewatering chamber, a filter chamber successive to and surrounding said dewatering chamber, a plurality of annular filters within said filter chamber, fan blades connected at innermost periphery to the bottom of said dewatering chamber and revolving therewith, means for causing a fluid current to traverse said filters, a dust chamber superimposed on said filter chamber, means for communicating between said filter chamber and said dust chamber, means for causing a separation of the lighter particles from the heavier particles in said current within said dust chamber, means for collecting the lighter particles, and means affording an outlet passage for said collected heavier particles.

5. In sewage purifiers comprising in combination, a sedimentation chamber and a revoluble mounted dewatering chamber communicating with each other by gravity action, fixed blades fixed to and revolving with said dewatering chamber, means for driving said dewatering chamber, an overflow passage leading upwardly and outwardly from approximately the central portion of said dewatering chamber, and means affording an upward and outward liquid current in said overflow passage and returning it to said sedimentation chamber.

6. The combination of a sewage purifier, a sedimentation chamber and a dewatering chamber communicating with each other, means for supplying sewage to the sedimentation chamber, means for supplying sludge to the dewatering chamber, means for utilizing centrifugal force to dewater the sludge in the dewatering chamber, intermittent means for distributing said sludge, a plurality of filters for receiving said distributed sludge, and means for carrying off the filtered liquid.

7. A sewage purifier, comprising in combination, a sedimentation chamber and a dewatering chamber communicating with each other, means for supplying sewage to the sedimentation chamber and means for supplying sludge to the dewatering chamber, a filter chamber surrounding said dewatering-chamber, and containing a plurality of filter screens, means for dewatering the sludge, means for charging said screens with the dewatered material, means for causing a current of air to flow through said screens and releasing the partially dried particles adhering to said screens and causing the current of air laden with said particles to flow outwardly from said filter chamber, a superimposed dust chamber and a current passage leading thereto from said filter chamber, a revoluble dust ejector adjoined to said current passage, means for causing a separation of the lighter particles from the heavier particles in said current, means for collecting the lighter particles, and a final outlet passage for the collected product.

8. In sewage separators, the combination of a sedimentation chamber and a dewatering chamber, means for supplying sewage to the sedimentation chamber, and means for supplying sludge to the dewatering chamber, a surrounding filter chamber containing a plurality of laminated annular trays filled with a granular material other than the material undergoing separation, means for casting a horizontal stream of atomized sludge throughout said filter trays, means for causing a forced air current to flow through said filters for cleansing the same, means for drying the filtered sludge, means for collecting the particles of dried sludge, and means for ejecting the dried sludge product.

9. In sewage purifiers, the combination of a sedimentation chamber and a dewatering chamber communicating therewith, means for supplying the sludge to be treated, a filter chamber, means for causing a fluid current therein, a superimposed dust chamber upon said filter chamber and a current passage between said filter chamber and said dust chamber, means for circulating said current in a cyclonic action, reverse and return passages for said current successive to said cyclonic current, said return passages leading downward and outwardly of said filter chamber and entering the initial point of said circulating current.

10. A sewage purifier comprising in combination, a dewatering-chamber and a surrounding filter chamber, means for distributing dewatered sludge in a finely divided state throughout said filter, means for forcing streams of air through said filter, means for propelling the drying particles of sludge through said filter chamber, a dust collecting chamber and a current passage leading thereto from said filter chamber, a plurality of fan blades revolving with said dewatering-chamber for producing an air current thereby extracting the particles from the air current laden with the same, a closed cylinder surrounding said fan blades for collecting said particles from said air current laden with same, means affording a return current passage communicating between the top of said dust chamber and the initial point of said current below said filter chamber.

11. In sewage purifiers, the combination of a sedimentation chamber and a dewatering chamber communicating between each other, means for supplying sewage to said dewatering chamber and centrifugal means for discharging sludge from said dewatering chamber, a plurality of filter trays surrounding said dewatering chamber and a plurality of conical superposed screens above said dewatering chamber, means for charging said filter trays, means for charging said filter screens, and means for collecting the suspended solids so cast on said filters.

12. In a sewage purifier, the combination of a plurality of filters surrounding a sludge dewatering chamber, said dewatering chamber being provided with a conduit outlet pipe and a series of nozzular openings in such conduit, said nozzular openings being in turn provided with a series of spring balanced outlet valves, means for forcing the dewatered sludge through said openings and means for controlling the flow of sludge through said openings.

13. In sewage purifiers, the combination of a sedimentation chamber and dewatering chamber communication with each other, a filter chamber surrounding said dewatering chamber, means for supplying sewage to said sedimentation chamber, means for supplying sludge to said dewatering chamber, means for forcing sludge from said dewatering chamber, a superimposed dust chamber for receiving dried solids in said sludge, a receiving pan placed below said filter chamber to catch the liquid passing said filter, means for collecting the dried sludge and means for draining said filter.

14. In combination a casing, means inside of said casing for causing a spray of sludge, means below said casing for causing a current of sludge to flow therein, an annular filter surrounding said spray and providing an upper outlet for the precipitated material and a lower outlet for the filtered liquid, a sinuous current passage above said filter for receiving said current successive to said filter for extracting particles carried by said current, an annular chamber adjoined to and in free communication with said sinuous passage for collecting said particles, and means affording a communicating passage with said chamber and a final outlet door.

15. In combination a casing, means inside of said casing for causing a spray of sludge therein, an annular filter surrounding said spray and receiving the suspended matter in said sludge, means below said casing for causing a current to flow therein and through said filter, a sinuous current passage above said filter for receiving said current successive to said filter for extracting particles carried by said current, an annular dust chamber surrounding said sinuous passage, an exhaust passage above said dust chamber and communicating therewith, a reverse and return passage communicating with said exhaust passage and the initial current below said casing, a damper in said exhaust passage above said reverse and return passage, means for exhausting said current to the atmosphere and means for reversing and returning said current to its initial source.

16. In sewage purifiers, a casing, means below said casing for causing a current to flow therein, means for causing material to be distributed throughout said current, filtering means comprising a plurality of annular screens in the path of said current, means for separating the particles of solids from the liquid in said material throughout said filter, a supplemental blower outside of said casing for causing an auxiliary current to flow through said screens for catching the particles retained in said filter, and means for cleaning said filter.

JOHN P. BALL.

Witnesses:
ALICE M. BALL,
GEO. M. BALL.